United States Patent [19]

Kosaka

[11] Patent Number: 5,172,155
[45] Date of Patent: Dec. 15, 1992

[54] REMOTE CONTROL APPARATUS FOR AN AUTO-FOCUS CAMERA

[75] Inventor: Toru Kosaka, Zama, Japan
[73] Assignee: Nikon Corporation, Tokyo, Japan
[21] Appl. No.: 640,921
[22] Filed: Jan. 14, 1991
[30] Foreign Application Priority Data
  Jan. 19, 1990 [JP] Japan ................... 2-9894
[51] Int. Cl.⁵ .................. G03B 13/36; G03B 17/38
[52] U.S. Cl. ........................ 354/403; 354/266
[58] Field of Search ............ 354/403, 266, 401
[56] References Cited

U.S. PATENT DOCUMENTS

| | | | |
|---|---|---|---|
| 4,239,356 | 12/1980 | Freudenschuss et al. | 354/401 |
| 4,441,810 | 4/1984 | Momose | 354/403 X |
| 4,571,048 | 2/1986 | Sugawara | 354/403 |
| 4,943,824 | 7/1990 | Nabeshima et al. | 354/403 X |
| 4,998,125 | 3/1991 | Watanabe et al. | 354/403 |
| 5,014,080 | 5/1991 | Miyadera | 354/403 |
| 5,047,793 | 9/1991 | Shiomi | 354/266 X |

FOREIGN PATENT DOCUMENTS 60-249127 12/1985 Japan.
62-123436 6/1987 Japan.

Primary Examiner—W. B. Perkey
Attorney, Agent, or Firm—Shapiro and Shapiro

[57] ABSTRACT

A remote control apparatus for an auto-focus camera according to the present invention has a transmitter for transmitting a light signal for remote control, and a light receiver producing a pair of output signals reciprocally varying in conformity with a light receiving position on a light receiving surface thereof which is in a distance measurement range in a photographing picture plane. When the light receiver receives the light signal for remote control transmitted from the transmitter, a control signal for starting a photographing operation is produced on the basis of the sum of the pair of output signals. The output signals are also used for the production of a light receiving position signal for range finding.

18 Claims, 10 Drawing Sheets

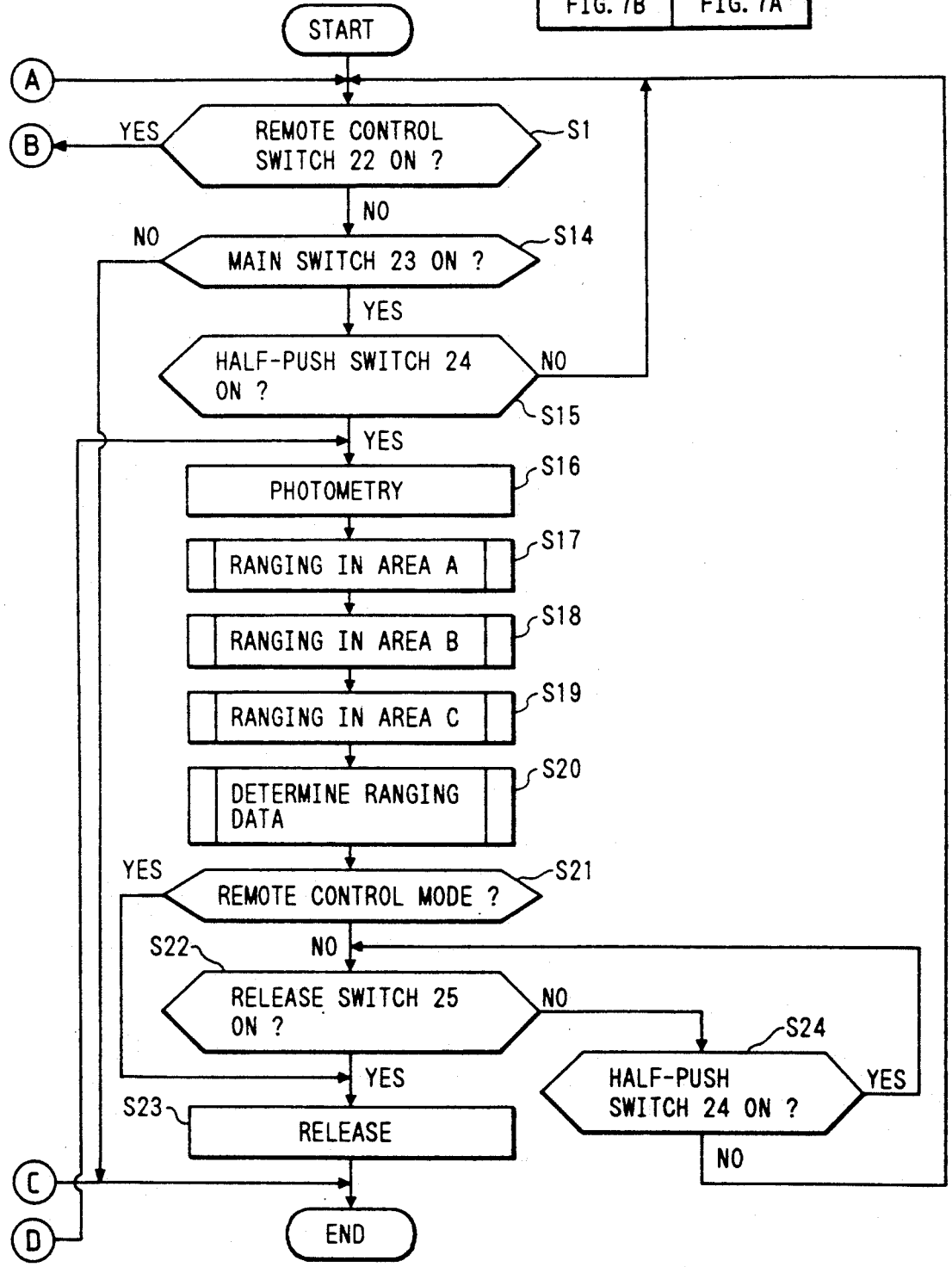

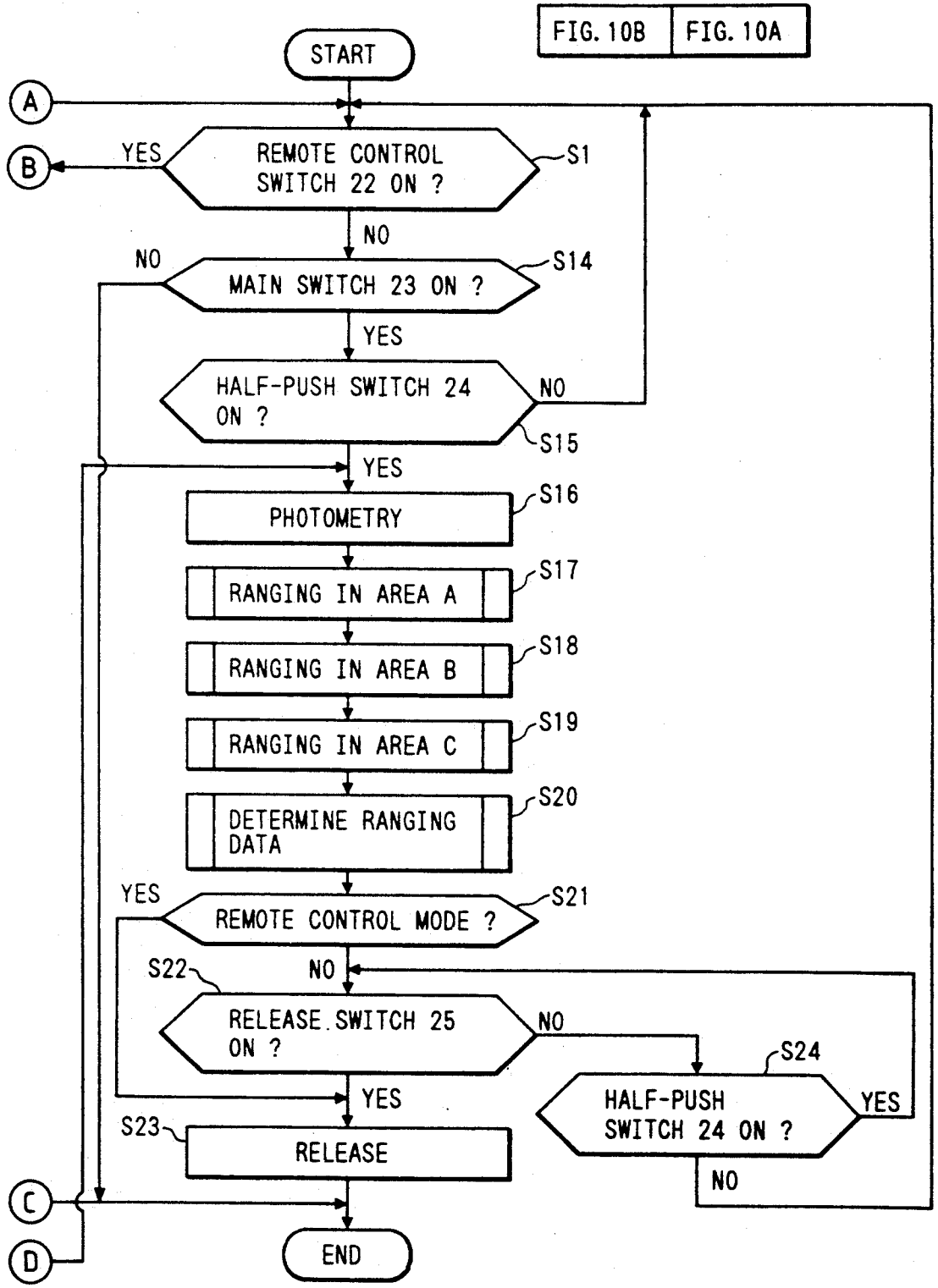

REMOTE CONTROL APPARATUS FOR AN AUTO-FOCUS CAMERA

BACKGROUND OF THE INVENTION

1. Field of the Invention

This invention relates to a remote control apparatus for an auto-focus camera.

2. Related Background Art

In recent years, in conformity with the diversification of the method of utilization of cameras, there has been proposed an apparatus in which a person who is an object emits light from a remote control transmitter toward a camera and shutter release is effected on the basis of the light.

Also, there have recently been proposed remote control apparatuses in which a part of the wave receiving optical system or the signal processing circuit of an active auto-focus device is also used to realize the remote release function (Japanese Laid-Open Patent Application No. 60-249127 and Japanese Laid-Open Patent Application No. 62-123436).

In the above-mentioned publications, however, there is no disclosure of the specific construction and operation of light receiving means for receiving a light signal for remote control transmitted from a remote control transmitter when a part of the wave receiving optical system or the signal processing circuit of the active auto-focus device is also used.

SUMMARY OF THE INVENTION

A remote control apparatus for an auto-focus camera according to the present invention has light receiving means producing a pair of output signals reciprocally varying in conformity with a light receiving position on a light receiving surface which lies within the distance measurement range of a photographing picture plane. Further, when the camera is in the distance measuring condition, a light receiving position signal for focusing conforming to the distance of an object is produced on the basis of the ratio of said two output signals, and when the camera receives a light signal for remote control transmitted from a remote control transmitter, a control signal for starting a photographing operation is produced on the basis of the sum of said two output signals.

In one mode of the present invention, the light receiving means has two light receiving portions, i.e., a first light receiving portion for receiving light in a distance measurement range located substantially centrally of the photographing picture plane, and a second light receiving portion for receiving light in a distance measurement range located outside the center of the photographing picture plane, and first and second pairs of output signals are produced in conformity with the light received by the respective light receiving portions. Light receiving position signals are produced on the basis of the ratio between said first and second pairs of output signals, respectively, an when said light receiving means receives the light signal for remote control, a control signal is produced on the basis of the sum of the first pair of output signals. In other words, range finding is effected in both distance measurement ranges, and the detection of the light signal for remote control is effected only in the central distance measurement range.

In another mode of the present invention, the light receiving means has two light receiving portions, i.e., a first light receiving portion for receiving light in a distance measurement range located substantially centrally of the photographing picture plane, and a second light receiving portion for receiving light in a distance measurement range located outside the center of the photographing picture plane, and first and second pairs of output signals are produced in conformity with the light received by the respective light receiving portions. Light receiving position signals are produced on the basis of the ratios between said first and second pairs of output signals, respectively, and when said light receiving means receives the light signal for remote control, a control signal is produced on the basis of the sum of the first and second pairs of output signals. In other words, both of range finding and the detection of the light signal for remote control are effected in both distance measurement ranges.

In the invention, the detection of the light signal for remote control is effected on the basis of the sum of the output signals and therefore, the present invention has the advantage that the remote release operation is reliably performed even if the output of the light signal for remote control transmitted from the transmitter is weak.

Also, according to the present invention, where the light receiving means has a first light receiving portion for receiving light from an object lying within a distance measurement range located substantially centrally of the photographing picture plane and a second light receiving portion for receiving light from an object lying within a distance measurement range located outside the center of the photographing picture plane, the range finding operation is performed in conformity with the ratio of the output signals of said first light receiving portion and the ratio of the output signals of said second light receiving portion and also, the remote release operation is performed in conformity with the sum of the output signals of said first light receiving portion. Accordingly, when the light signal for remote control is received by said first light receiving portion, there is a high possibility that an object to which this light signal for remote control is transmitted from the transmitter lies within a distance measurement range corresponding to said first or second light receiving portion and therefore, focusing on the object can be reliably accomplished.

Also, according to the present invention, the range finding operation is performed in conformity with the ratio of the output signals of said first light receiving portion and the ratio of the output signals of said second light receiving portion and also, the remote release operation is performed in conformity with the sum of the output signals of said first and second light receiving portions. Accordingly, if the light signal for remote control remote control transmitted from the transmitter is received by the first and second light receiving portions, the remote release operation will be performed and therefore, the range of the position of the transmitter which performs the remote control operation can be widened.

BRIEF DESCRIPTION OF THE DRAWINGS

FIGS. 10A and 10B are operation flow charts.

DESCRIPTION OF THE PREFERRED EMBODIMENTS

The present invention will hereinafter be described with reference to the drawings.

Figure 1:
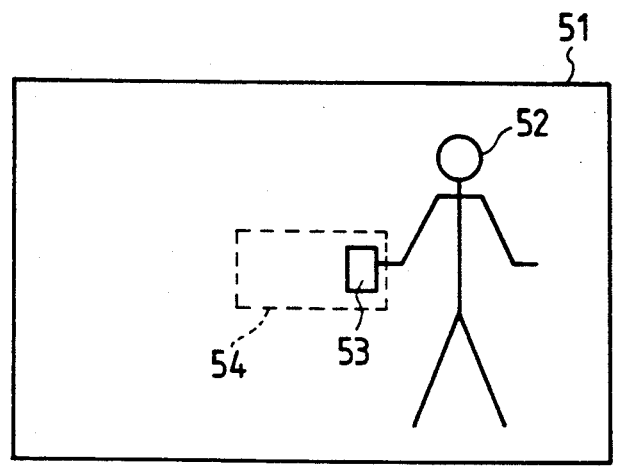
FIG. 1 illustrates a viewfinder in a first embodiment of a remote control apparatus for an auto-focus camera according to the present invention.

FIG. 1 illustrates a viewfinder in a first embodiment of a remote control apparatus for an auto-focus camera according to the present invention. The reference numeral 51 designates a viewfinder corresponding to the photographing picture plane, the reference numeral 52 denotes an object, the reference numeral 53 designates a remote control transmitter (hereinafter referred to as the transmitter), and the reference numeral 54 denotes the distance measurement range (the focus area). Light receiving means, not shown in FIG. 1, produces two output signals reciprocally varying in conformity with the light receiving position on the light receiving surface of the light receiving means itself. A light receiving position signal is produced on the basis of the ratio of said two output signals, and the design is such that when the light receiving means receives a light signal for remote control, a control signal is produced on the basis of the sum of the two output signals produced by the light receiving means.

Operation will now be described.

When the preparation for photographing is finished, a person corresponding to the object 52 operates the transmitter 53 to transmit a light signal for remote control (hereinafter referred to as the remote control signal) indicative of shutter release. When this remote control signal arrives at the distance measurement range 54 and is received by the light receiving surface of the light receiving means, two output signals reciprocally varying in conformity with the light receiving position on the light receiving surface are produced, and a series of release preparation operations and release operation are performed in conformity with a control signal produced on the basis of the sum of these two output signals. That is, when an infrared ray signal for auto-focusing is transmitted from the light emitting element (not shown in FIG. 1) of the camera to the object 52 and said infrared ray signal which has impinged on the object and has been reflected thereby arrives at the distance measurement range 54 and is received by the light receiving surface of the light receiving means, two output signals reciprocally varying in conformity with the light receiving position on the light receiving surface are likewise produced, and a light receiving position signal is produced on the basis of the ratio of these two output signals, and the auto-focusing operation is performed on the basis of this light receiving position signal, whereafter shutter release is done to effect photographing.

However, in the first embodiment described above, there is the possibility that the following disadvantage occurs. When the person who is the object 52 indicates remote release from the transmitter 53 while being in an area outside the distance measurement range 54, the auto-focusing device cannot be focused on the object 52 and therefore is focused on anything other than the object 52 which has happened to be caught in the distance measurement range 54 and thus the taken photograph is not focused on the object 52 and becomes out of focus.

Figure 2:
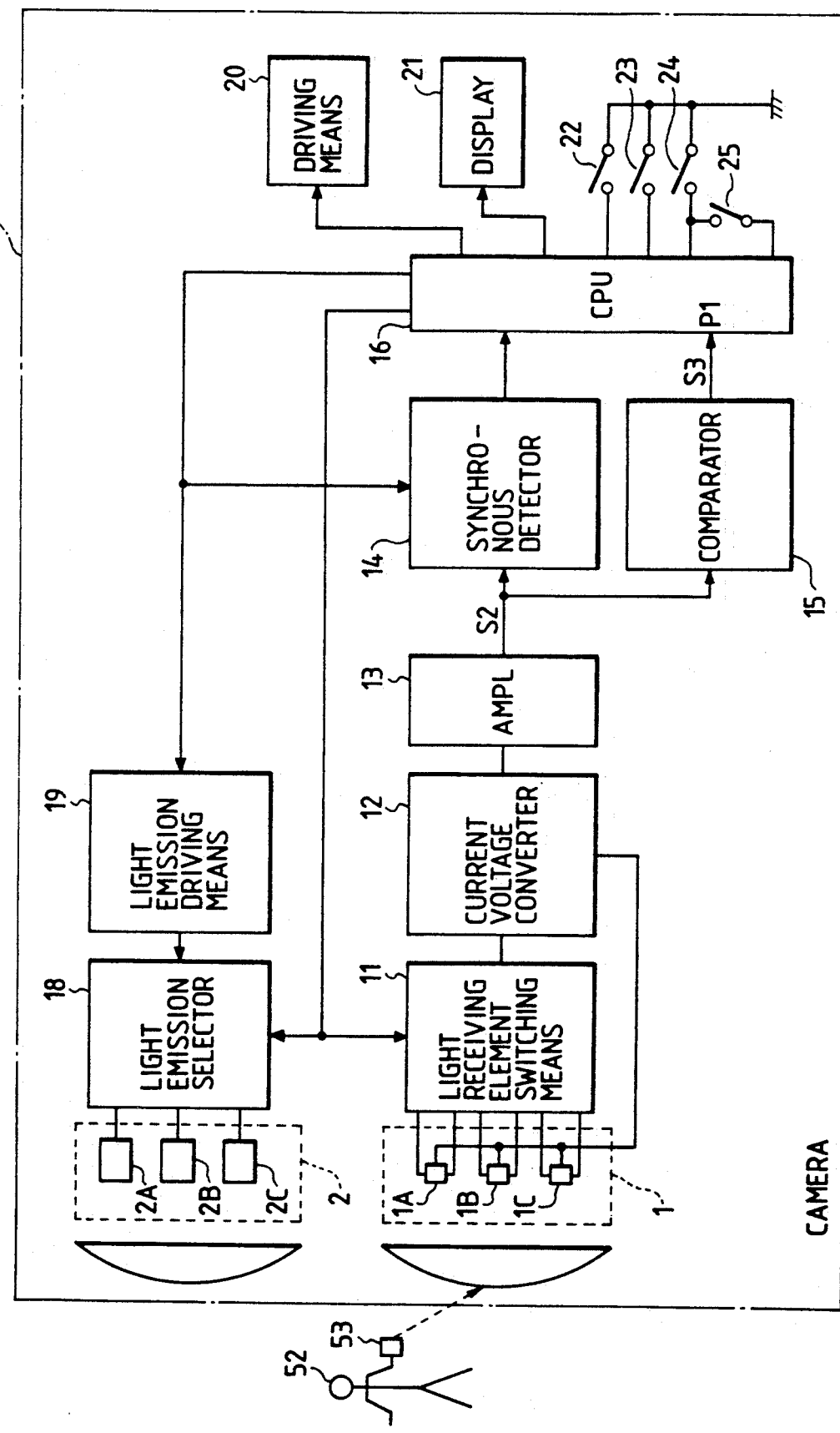
FIG. 2 is a block diagram showing second and third embodiments of the present invention.

FIG. 2 is a block diagram showing a second embodiment which eliminates such a disadvantage. In FIG. 2, the reference numeral 100 designates a camera.

The reference numeral 1 denotes a light receiving element unit comprising three semiconductive position detecting elements (hereinafter referred to as the PSDs: position sensor devices) 1A, 1B and 1C, the reference numeral 11 designates light receiving element switching means for inputting thereto signals output from the PSDs 1A, 1B and 1C and selecting and outputting them, the reference numeral 12 denotes current-voltage converting means for converting a current signal output from the light receiving element switching means 11 into a voltage signal, the reference numeral 13 designates amplifying means for amplifying the voltage signal and outputting it to synchronous detector means 14 and a comparator 15, and the reference numeral 16 denotes a CPU. The synchronous detector means 14 receives as an input in synchronism with the light emitting operation of a light emission element unit 2, which will be described later, a light receiving signal input from the light receiving element unit 1 through the current-voltage converting means 12 and the amplifying means 13 in response to said light emitting operation, and outputs the synchronously detected light receiving signal to the CPU 16. The comparator 15 waveformshapes the signal input from the amplifying means 13 into a pulse signal. Each PSD has two terminals and is designed such that the outputs from the two terminals vary in conformity with the position of a light beam on the light receiving surface thereof.

The reference numeral 2 designates a light emission element unit comprising three infrared light emission diodes (hereinafter referred to as the IREDs) 2A, 2B and 2C provided correspondingly to the PSDs 1A–1C, the reference numeral 18 denotes light emission selector for selecting and causing the IREDs 2A, 2B and 2C to emit light, and the reference numeral 19 designates light emission driving means for driving the light emission element unit 2. The reference numeral 20 denotes driving means for driving a shutter, not shown, and a mechanism unit such as a film winding device, and the reference numeral 21 designates display means for displaying predetermined information to the operator.

The transmitter 53 is adapted to be normally mounted on the body of the camera 100, and to be removed from the camera 100 when the transmitter 53 is used. The design is made such that when the transmitter 53 is removed from the camera 100, a remote control switch 22 is closed. The reference numeral 23 denotes the main switch of the camera 100, the reference numeral 24 designates a half-push switch for the shutter, and the reference numeral 25 denotes a release switch for the shutter. When a shutter button (not shown) is depressed, the half-push switch 24 first becomes closed and informs the CPU 16 of the half-pushed state of the shutter. When the shutter button is further depressed, the release switch 25 will soon become closed and release the shutter.

Figure 3:
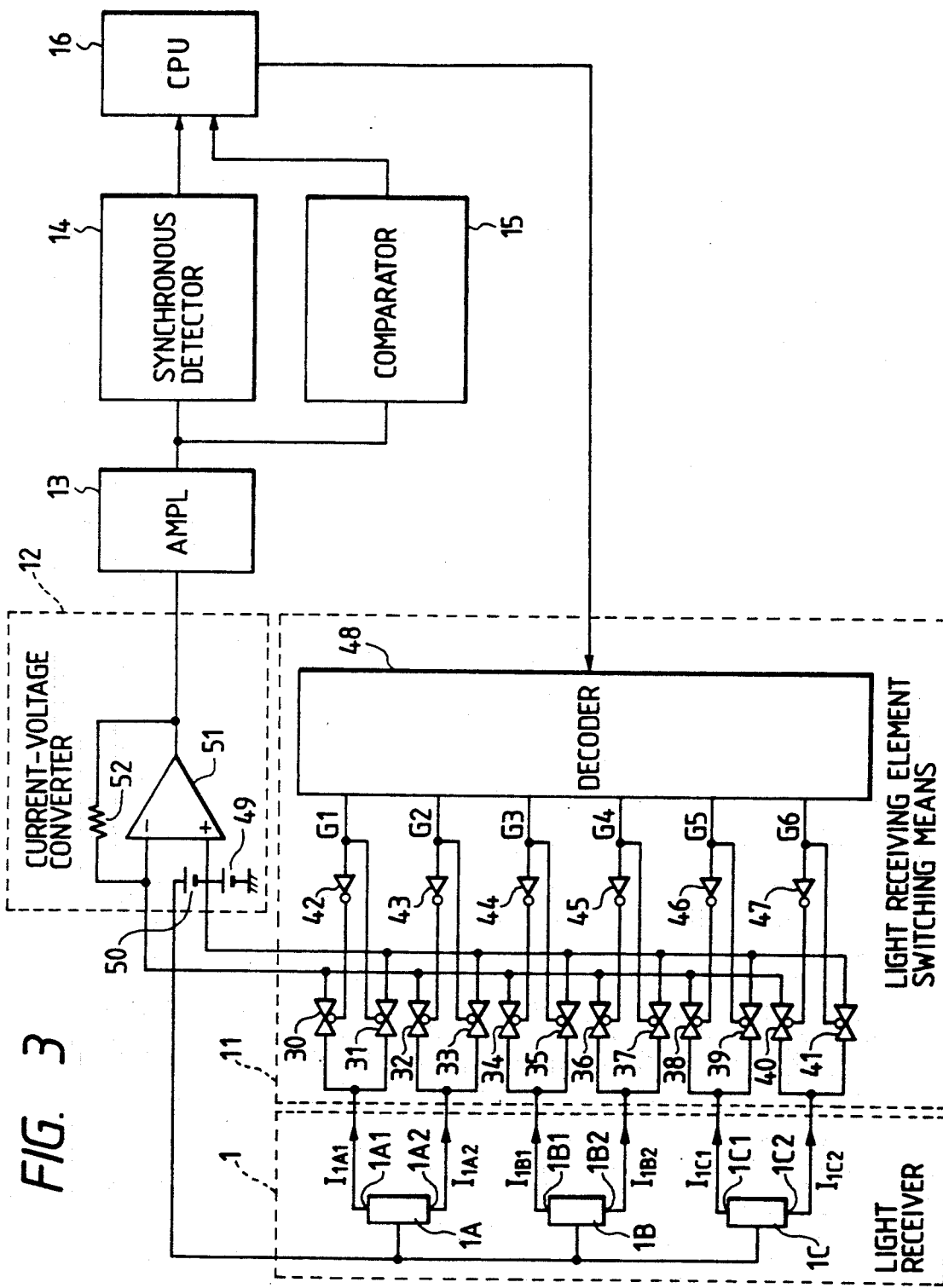
FIG. 3 is a detailed block diagram of light receiving element switching means in the second and third embodiments.

FIG. 3 is a block diagram showing a specific example of the light receiving element switching means 11. The reference numerals 30–41 designate transmission gates adapted to become conductive when the control input is "L", the reference numerals 42-47 denote inverters, and the reference numeral 48 designates a decoder which outputs selection signals G1-G6 in accordance with a control signal from the CPU 16. The decoder 48 renders any one of the selection signals G1-G6 into "H", thereby selectively rendering one of the transmission gates 30-41 conductive. As a result, an output terminal of one of the PSDs 1A-1C is connected to the current-voltage converting means 12, whereby one of light receiving currents $I_{1A1}$, $I_{1A2}$, $I_{1B1}$, $I_{1B2}$, $I_{1C1}$ and $I_{1C2}$ is output to the current-voltage converting means 12.

The PSDs 1A-1C each have two output terminals, as shown in FIG. 3. That is, the PSD 1A has output terminals 1A1 and 1A2, the PSD 1B has output terminals 1B1 and 1B2, and the PSD 1C has output terminals 1C1 and 1C2. Accordingly, as shown in the table below, the output terminals of PSDs 1A-1C corresponding to the selection signals G1-G6 of "H" are connected to the minus side input terminal of an operational amplifier 51 in the current-voltage converting means 12, and the output terminals of the PSDs 1A-1C corresponding to the selection signals G1-G6 of "L" are connected to the plus side input terminal of the operational amplifier 51 in the current-voltage converting means 12. As a result, signals G1-G6 are selectively rendered into "H", whereby only the light receiving currents of the PSDs 1A-1C selected by the light receiving element switching means 11 may be converted into a voltage signal by the current-voltage converting means 12.

Also, the sum of a plurality of light receiving currents can be obtained by rendering the selection signals G1-G6 into "H" at the same time.

TABLE

| State of selection signals | | Output terminals of PSDs | | Input terminals of operational amplifier 51 to which the output terminals of PSDs are connected |
|---|---|---|---|---|
| G1 | H | 1A | 1A1 | − side |
|    | L |    | 1A1 | + side |
| G2 | H |    | 1A2 | − side |
|    | L |    | 1A2 | + side |
| G3 | H | 1B | 1B1 | − side |
|    | L |    | 1B1 | + side |
| G4 | H |    | 1B2 | − side |
|    | L |    | 1B2 | + side |
| G5 | H | 1C | 1C1 | − side |
|    | L |    | 1C1 | + side |
| G6 | H |    | 1C2 | − side |
|    | L |    | 1C2 | + side |

In the current-voltage converting means 12, the reference numerals 49 and 50 designate bias power sources, the reference numeral 51 denotes an operational amplifier, and the reference numeral 52 designates a feedback resistor. The light receiving currents $I_{1A1}$-$I_{1C2}$ of the PSDs 1A-1C input to the minus input terminal of the operational amplifier 51 are connected from current signals into voltage signals, which are output to the amplifying means 13. The output voltage value at this time is the product of the current value input to the operational amplifier 51 and the resistance value of the feedback resistor 52.

The details of the light receiving means and light emission elements corresponding to FIG. 1 which have been described in the first embodiment are entirely the same as those in FIGS. 2 and 3 exclusive of the PSDs 1B, 1C, IREDs 2B, 2C and parts associated with these.

Figure 4:
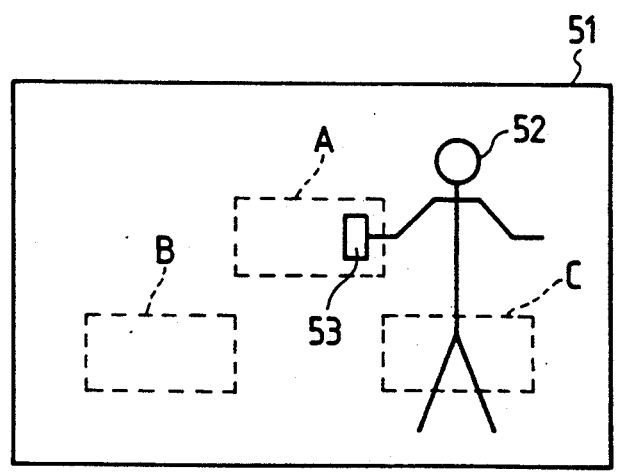
FIG. 4 illustrates a viewfinder.

FIG. 4 is an illustration showing the viewfinder of the camera 100 having a remote control apparatus in a second embodiment, and in FIG. 4, the same reference numerals as those in FIG. 1 designate corresponding portions. The distance measurement ranges A, B and C correspond to the IREDs 2A, 2B, 2C and PSDs 1A, 1B, 1C, respectively. That is, infrared light which has been emitted from the IRED 2A and has impinged on an object in the distance measurement range A and has been reflected back is designed to be received by the PSD 1A. With regard also to the distance measurement ranges B and C, the relations thereof with the IREDs 2B, 2C and the PSDs 1B, 1C are similar to what has teen described above.

Figure 5:
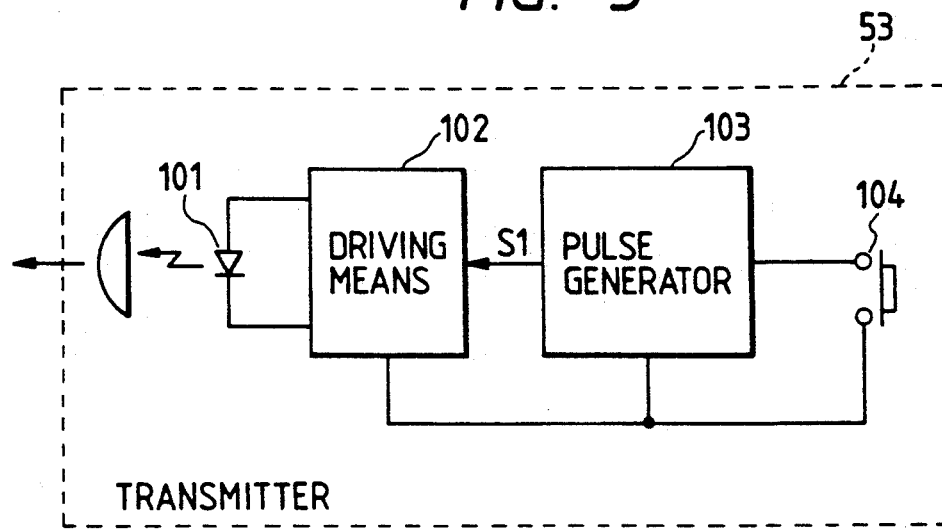
FIG. 5 is a block diagram of a transmitter.
Figure 6:
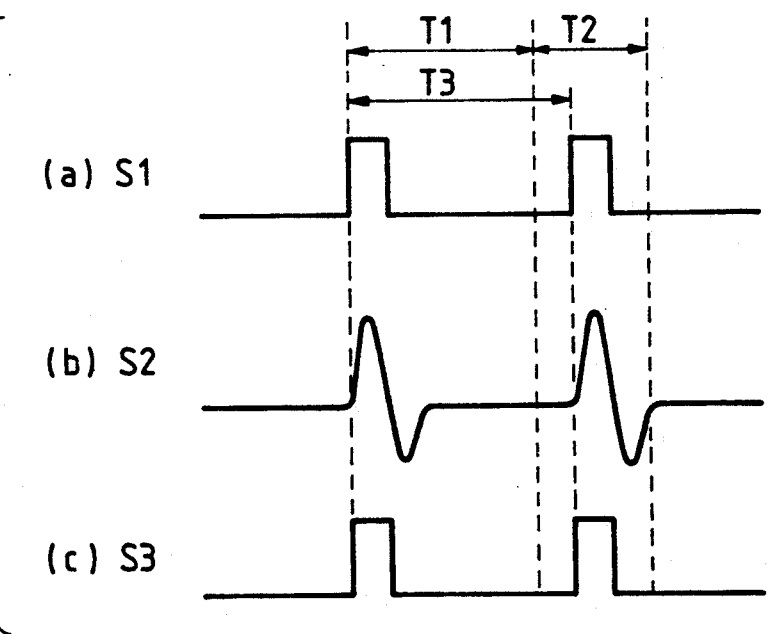
FIG. 6 shows the waveforms of signals $S_1$–$S_3$.

FIG. 5 is a block diagram of the transmitter 53. The reference numeral 102 designates driving means for driving IRED 101, the reference numeral 103 denotes pulse generator means for generating two pulses of a predetermined time interval, and the reference numeral 104 designates a transmission switch. When the transmission switch 104 is depressed, the pulse generator means 103 generates two pulses of a predetermined time interval and outputs them to the driving means 102. The driving means 102 drives the IRED 101 correspondingly to the input two pulses and causes it to output an infrared light signal twice. At this time, as shown in FIG. 6(a), a pulse signal $S_1$ output from the pulse generator means 103 is controlled so that $T1 \leq T3 \leq T1+T2$, where T3 is the time interval between the first pulse and the second pulse. FIG. 6(b) shows a light receiving signal $S_2$ resulting from the infrared light signal emitted correspondingly to the pulse signal $S_1$ having been received and amplified by the light receiving element unit 1 of the camera 100, and FIG. 6(c) shows a pulse signal $S_3$ after the light receiving signal $S_2$ has been shaped into a pulse waveform.

A description will now be given of the remote control operation in the camera thus constructed. In the remote control operation, a remote control signal is transmitted to the camera 100 by the operation of the remote control switch 104 of the transmitter 53, and in response thereto, the light metering operation, the range finding operation and the release operation are executed in succession. That is, the light receiving element unit 1 is adapted to successively execute the remote control signal receiving operation and the light receiving operation for the range finding operation.

A description will hereinafter be given in detail with reference to the flow chart of FIG. 7.

First, when the ON or OFF of the remote control switch 22 is confirmed, that is, the transmitter 53 is removed from the body of the camera 100 and the remote control switch 22 is closed, only the selection signals G1 and G2 corresponding to the PSD 1A become "H" and only the PSD 1A become active (steps S1 and S2).

If the step S1 is "N", the ON or OFF of the main switch 23 and the ON or OFF of the half-push switch 24 is confirmed, and if both switches are ON, shift is made to a step S16 to execute the ordinary photographing operation (steps S14 and S15), and if the switch 23 is OFF, the operation is terminated.

When the operator operates the transmission switch 104 of the transmitter 53 and two infrared light signals of a predetermined time interval corresponding to the pulse signal $S_1$ (FIG. 6(a)) are transmitted, a light receiving current $I_{1A1}+I_{1A2}$ is output from the light receiving element unit 1 of the camera 100 which has received the infrared light signals to the current-voltage converting means 12. The voltage signal $S_2$ (FIG. 6(b)) output from the current-voltage converting means 12 is amplified by the amplifying means 13, whereafter it is shaped into the pulse signal $S_3$ (FIG. 6(c)) by the comparator 15 and is input to the port Pl of the CPU 16 (step S2).

When the CPU 16 receives the first pulse as an input (step S3), it starts a timer which counts a predetermined time T1 and thereafter counts a predetermined time T2 (steps S4 and S5), and when the second pulse is input (step S6) by the time when the counting of the time T2 is terminated, the CPU 16 judges that the remote control signal from the transmitter 53 has been input and sets the camera 100 to the remote control mode and also displays on the display means 21 that the camera has been set to the remote control mode (step S7). The above-described series of operations are performed so that light (raise) other than the predetermined infrared light signal transmitted from the transmitter 53 may not be sensed.

If at a step S12, the second pulse is not input and the timer terminates, return is made ton the step S3 or S1 in conformity with the ON or OFF of the remote control switch 22 (step S13).

When the camera is set to the remote control mode, the counting of a predetermined time Tw is effected for the operator who is the object to hide the transmitter 53 from the photographing range (step S8). In the meantime, the ON or OFF of the remote control switch 22 and the ON or OFF of the main switch 23 is confirmed (steps S9 and S10), and if both of these switches are ON and the Tw timer has terminated (step S11), shift is made to a step S16. If the step S9 is "N", return is made to the step S1, and if the step S10 is "N", the operation is terminated, and if the step S11 is "N", return is made to the step S9.

The photometry of the step S16 is the same as that which is generally practised and therefore, it need not be described.

Subsequently, the range finding operations in areas A–C are successively executed (steps S17–S19).

When ranging data for use in the focusing operation is determined from the thus obtained ranging data of the areas A–C (step S20), whether the camera is in the remote control mode is examined (step S21), and if the camera is in the remote control mode, the release process (including AF control and AE control) is executed and the shutter is released (step S23). If the camera is not in the remote control mode, the ON or OFF of the release switch 25 is examined (step S22), and if the release switch 25 is ON, the release process is executed and the shutter is released (step S23), and if the release switch 25 is OFF, the ON or OFF of the half-push switch 24 is examined (step S24), and if the half-push switch 24 is ON, return is made to the step S22, and if the half-push switch 24 is OFF, return is made to the step S1.

The remote control operation is executed in the manner described above.

Figure 7B:
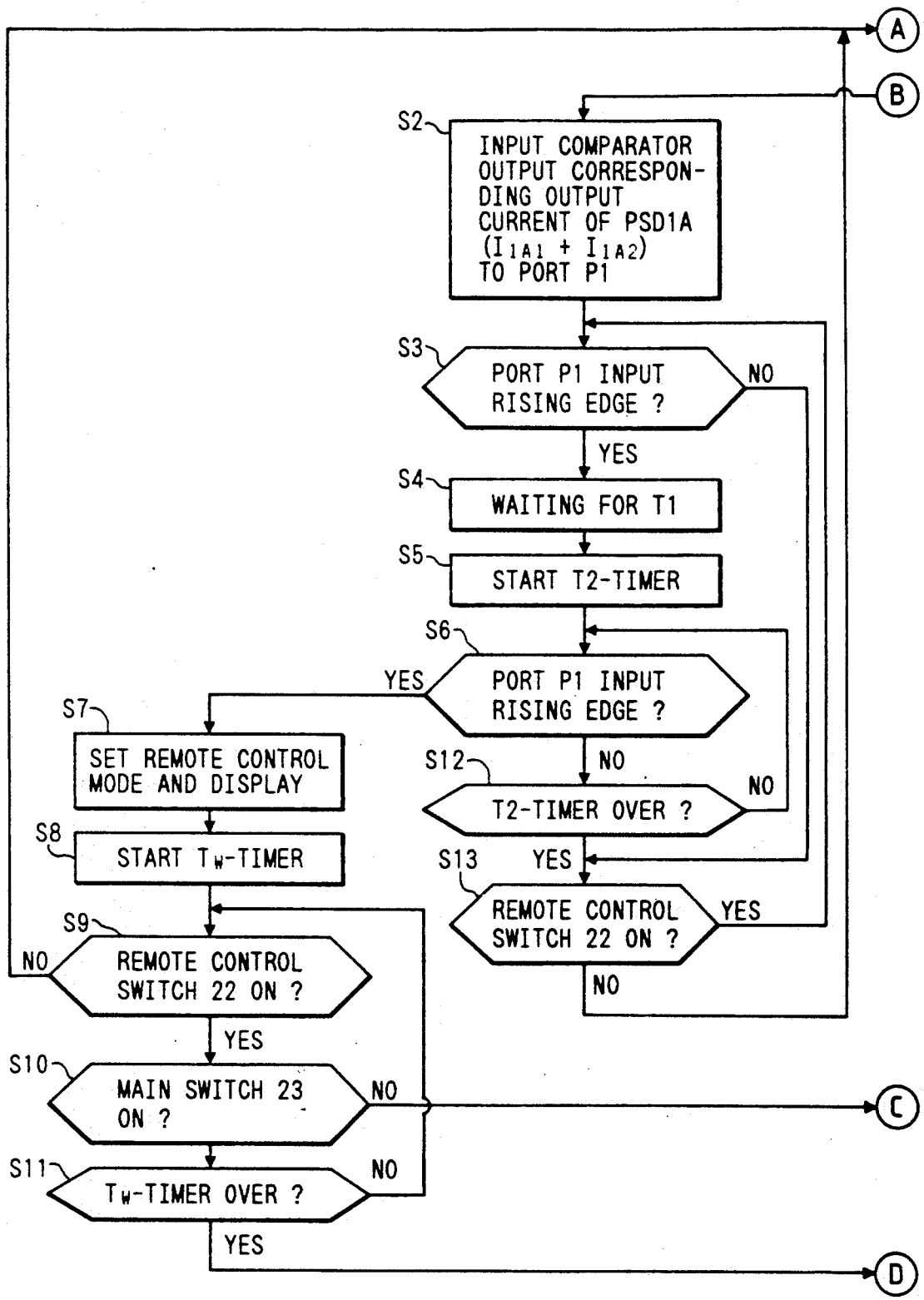
FIG. 7 comprising FIGS. 7A and 7B, FIG. 8, FIG. 9 and FIG. 10 comprising

The details of the flow corresponding to FIG. 1 described with respect to the first embodiment are the same as those in FIG. 7, except S18, S19 and S20, wherein the element corresponding to the light receiving element 34 of FIG. 1 is PSD 1A.

In the case of the second embodiment, the reception of the remote control signal is effected in the substantially central distance measurement range A of the photographing range shown in FIG. 4 and thus, when at least the reception of the remote control signal is effected, the person (object) who has performed the operation of the transmitter 53 is usually positioned in one of the distance measurement ranges A–C and therefore, the focusing operation on the object is reliably accomplished.

Figure 8:
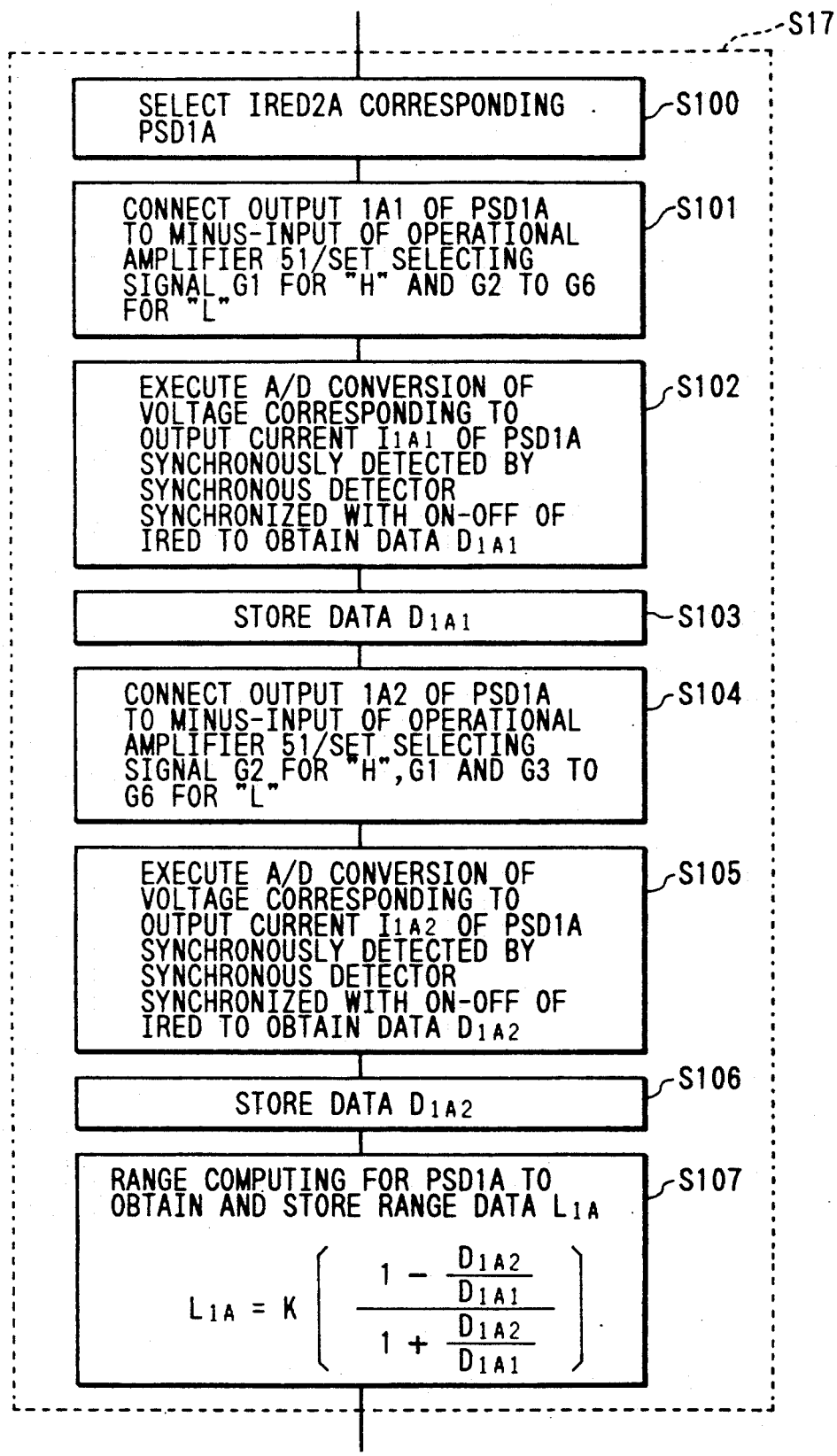

The range finding operations of steps S17–S19 will now be described with reference to a flow chart shown in FIG. 8, but since the operations of the steps S17–S19 are all similar, only the step S17 will be described in detail.

The light emission selector 18 selects the IRED 2A corresponding to the PSD 1A, in accordance with the control signal from the CPU 16 (step S100).

Since one output terminal 1A1 of the PSD 1A is connected to the minus side input terminal of the operational amplifier 51, only the selection signal G1 becomes "H" and all the other selection signals G2–G6 become "L" (see FIG. 3 and the table) (step S101).

In accordance with the driving signal from the CPU 16, the light emission driving means 19 causes the IRED 2A to emit light at predetermined time intervals. The infrared light which has impinged on and has been reflected by the object is received by the PSD 1A, and a voltage signal conforming to the light receiving current $I_{1A1}$ output from the output terminal 1A1 is detected by the synchronous detector means 14 and is A/D-converted by the CPU 16, whereafter it is stored as data $D_{1A1}$ (steps S102 and S103).

Subsequently, since the other output terminal 1A2 of the PSD 1A is connected to the minus side input terminal of the operational amplifier 51, only the selection signal G2 becomes "H" and all the other selection signals G1 and G3–G6 become "L" (see FIG. 3 and the table) (step S104).

As at the step S102, in accordance with the driving signal from the CPU 16, the light emission driving means 19 causes the IRED 2A to emit light at predetermined time intervals. The infrared light which has impinged on and has been reflected by the object is received by the PSD 1A, and a voltage signal conforming to the light receiving current $I_{1A2}$ output from the output terminal 1A2 is detected by the synchronous detector means 14 and is A/D-converted by the CPU 16, whereafter it is stored as data $D_{1A2}$ (steps S105 and S106). Subsequently, a predetermined range finding calculation as shown in the following equation (1) is carried out to find and store range data $L_{1A}$ S107).

$$L_{1A1} = K \frac{D_{1A1} - D_{1A2}}{D_{1A1} + D_{1A2}} \qquad (1)$$

$$= K \left( \frac{1 - \frac{D_{1A2}}{D_{1A1}}}{1 + \frac{D_{1A2}}{D_{1A1}}} \right)$$

($K$ is a constant).

The range finding calculation in the distance measurement range A is effected in this manner. This means that the greater is $L_{1A1}$, the shorter is the distance to the object.

Turning back to FIG. 7, range finding in the distance measurement ranges B and C is effected in a procedure similar to the above-described step S17, and range data $L_{1B1}$ and $L_{1C1}$ are calculated and stored (steps S18 and S19).

Subsequently, one of the range data $L_{1A1}$, $L_{1B1}$ and $L_{1C1}$ in the three distance measurement ranges A, B and C found in the above-described manner is selected and determined as formal range data on the basis of predetermined algorithm (step S20).

Figure 9:
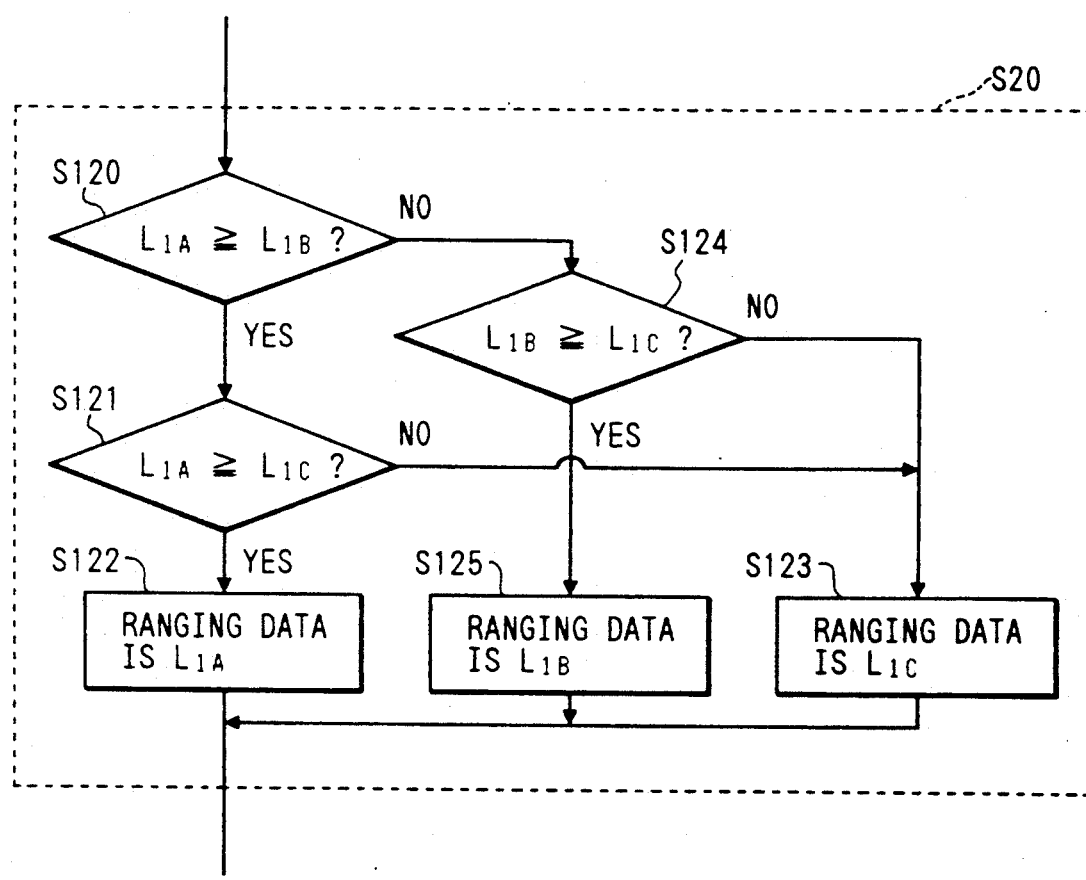

An example of the operation of determining the range data which is executed at the step S20 will now be described with reference to a flow chart shown in FIG. 9.

In this operation algorithm, the design is such that range data assuming a maximum value is determined as range data (priority is given to short distance information).

The range data $L_{1A1}$ and the range data $L_{1B1}$ are first compared with each other (step S120), and if the range data $L_{1A1}$ is equal to or greater than the range data $L_{1B1}$, the range data $L_{1A1}$ and the range data $L_{1C1}$ are compared with each other (step S121). If the range data $L_{1A1}$ is equal to or greater than the range data $L_{1C1}$, the range data $L_{1A1}$ is determined as range data, and if the range data $L_{1A1}$ is smaller than the range data $L_{1C1}$, the range data $L_{1C1}$ is determined as range data (steps S122 and S123). If at the step S120, the range data $L_{1B1}$ is greater than the range data $L_{1A1}$, the range data $L_{1B1}$ and the range data $L_{1C1}$ are compared with each other (step S124), and if the range data $L_{1B1}$ is equal to or greater than the range data $L_{1C1}$, the range data $L_{1B1}$ is determined as range data, and if the range data $L_{1C1}$ is greater than the range data $L_{1B1}$, the range data $L_{1C1}$ is determined as range data (steps S125 and S123).

Figure 10B:
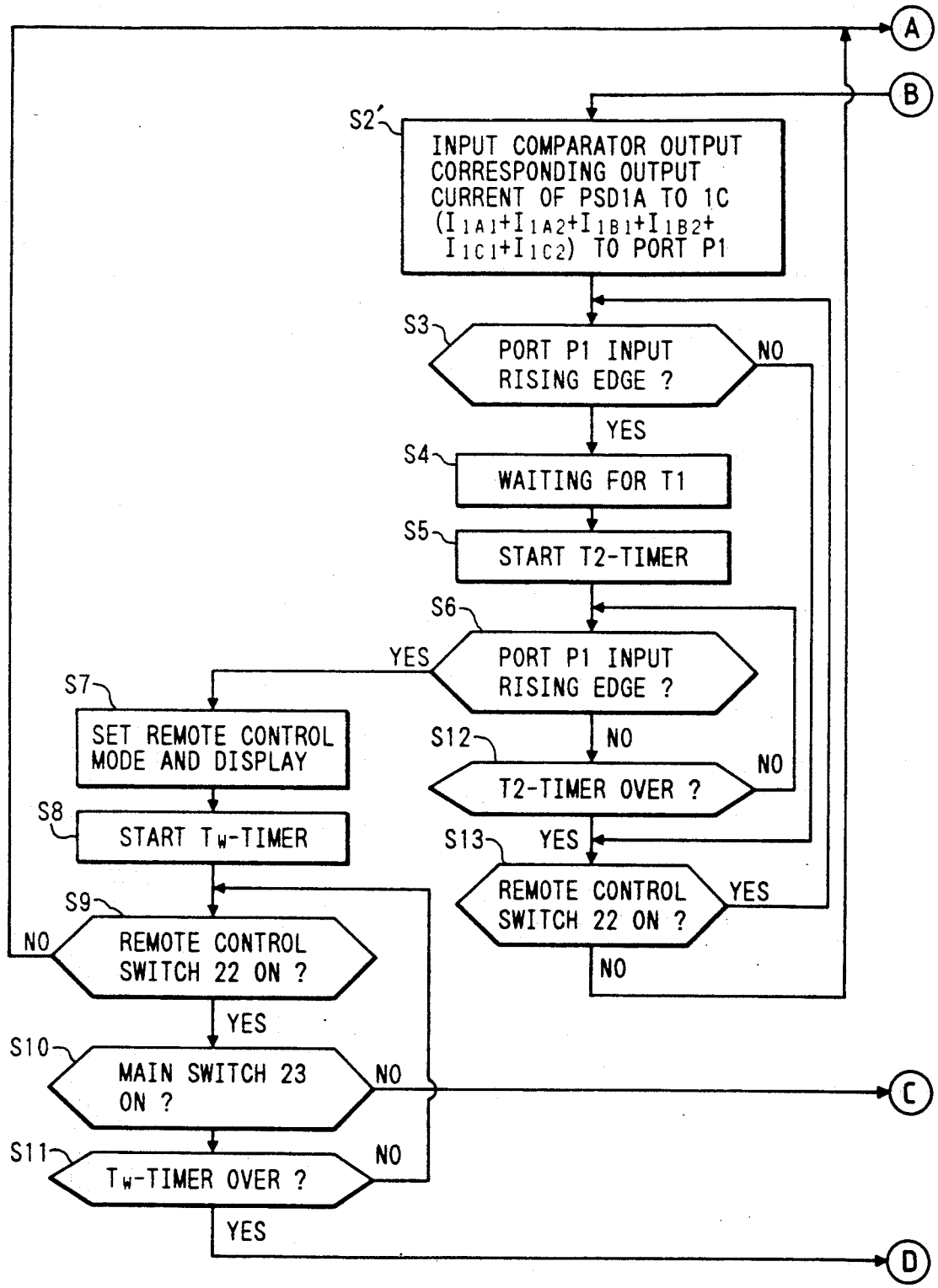

FIG. 10 is an operation flow chart showing a third embodiment of the present invention. In this third embodiment, the design is such that at the above-described step $S_2$ of FIG. 7, the remote control signal from the transmitter 53 is received by all of the three PSDs 1A-1C. In FIG. 10, the same step numbers as those in FIG. 7 show the same operations, and a description will hereinafter be given only of a step S2' in FIG. 10 which differs from the step S2 of FIG. 7. All of the selection signals G1-G6 corresponding to the PSDs 1A-1C become "H" and all of the PSDs 1A-1C become active (step S2'). If as a result, the remote control signal is received by any one of the PSDs 1A-1C, an operation similar to that in the case of FIG. 7 will be executed.

In this case, the remote control signal from the transmitter 53 can be received in all of the distance measurement ranges A-C shown in FIG. 4 and therefore, the range of the position of the transmitter which performs the remote control operation can be widened.

In the third embodiment described above, PSDs are used as light receiving elements, but this is not restrictive. Line sensors and multidivision light receiving elements can be used to output a light receiving position signal conforming to a light receiving position corresponding to the distance of the object.

I claim:
1. A remote control apparatus for an autofocus camera comprising:
light emitting means for emitting a light beam to a field to be photographed;
light receiving means for receiving a light beam and producing a pair of output signals reciprocally varying in conformity with a light receiving position on a light receiving surface of said light receiving means which is in a distance measurement area in a photographing picture frame, the ratio of said pair of output signals varying in response to the position of the light beam on the light receiving surface;
means for effecting a calculation on the basis of the ratio of said pair of output signals and producing a light receiving position signal conforming to the distance of the field, for effecting a focusing operation;
a transmitter for transmitting a light signal for remote control to said light receiving means; and
means producing a control signal for starting a photographing operation on the basis of the sum of said pair of output signals when said light receiving means receives said light signal for remote control.

2. A remote control apparatus for an autofocus camera comprising:
light emitting means for emitting light beams to a plurality of areas in a field to be photographed;
first light receiving means for receiving a light beam and producing a first pair of output signals reciprocally varying in conformity with a light receiving position on a light receiving surface of said first light receiving means which is in a distance measurement area located substantially centrally of a photographing picture frame, the ratio of said first pair of output signals varying in response to the position of the light beam on the light receiving surface;
second light receiving means for receiving a light beam and producing a second pair of output signals reciprocally varying in conformity with a light receiving position on a light receiving surface of said second light receiving means which is in a distance measurement area located outside the center of the photographing picture frame;
means for effecting calculations on the basis of the ratios of said first and second pairs of output signals, respectively, and producing corresponding light receiving position signals conforming to the distance of the field in the respective distance measurement areas, for effecting a focusing operation;
a transmitter for transmitting a light signal for remote control to said light receiving means; and
means producing a control signal for starting a photographing operation on the basis of the sum of said first pair of output signals when said first light receiving means receives said light signal for remote control.

3. A remote control apparatus for an autofocus camera comprising:
light emitting means for emitting light beams to a plurality of areas in a field to be photographed;
first light receiving means for receiving a light beam and producing a first pair of output signals reciprocally varying in conformity with a light receiving position on a light receiving surface of said first light receiving means which is in a distance measurement area located substantially centrally of a photographing picture frame, the ratio of said first pair of output signals varying in response to the position of the light beam on the light receiving surface;
second light receiving means for receiving a light beam and producing a second pair of output signals reciprocally varying in conformity with a light receiving position on a light receiving surface of said second light receiving means which is in a distance measurement area located outside the center of the photographing picture frame, the ratio of said second pair of output signals varying in response to the position of the light beam on the light receiving surface;

means for effecting calculations on the basis of the ratios of said first and second pairs of output signals, respectively, and producing corresponding light receiving position signals conforming to the distance of the field in the respective light measurement areas, for effecting a focusing operation;

a transmitter for transmitting a light signal for remote control to said light receiving means; and means based on the sum of at least one of said pairs of output signals for producing a control signal to start a photographing operation when at least one of said first and second light receiving means receives said light signal for remote control.

4. A camera capable of operating by a light beam applied by a remote control apparatus, including:
light emitting means for emitting a light beam to a field to be photographed;
light receiving means for receiving a light beam and producing a pair of output signals varying in conformity with the position of the light beam on a light receiving surface of the light receiving means, the ratio of said pair of output signals varying in response to the position of the light beam on the light receiving surface;
driving means for driving a photo-taking lens on the basis of the ratio of said pair of output signals; and
operating means adapted to operate on the basis of the sum of said pair of output signals when said light receiving means receives the light beam from said remote control apparatus.

5. A camera according to claim 4, wherein said operating means starts a photographing operation on the basis of the sum of said pair of output signals.

6. A camera according to claim 5, wherein said operating means causes said driving means to drive the photo-taking lens on the basis of the ratio of said pair of output signals, and thereafter starts a photographing operation.

7. A camera according to claim 4, wherein said remote control apparatus is provided removably from said camera, said camera further has detecting means for detecting the removal of said remote control apparatus from said camera and outputting a detection signal, and said operating means is responsive to said detection signal to determine the sum of said pair of output signals.

8. A camera according to claim 7, wherein said operating means also determines the difference between said pair of output signals.

9. A camera capable of operating by a light beam applied by a remote control apparatus, including:
light emitting means for emitting a light beam to a plurality of areas in a field to be photographed;
first light receiving means for receiving a light beam and producing a first pair of output signals, the ratio of said first pair of output signals varying in conformity with the position of a light beam from a first area of the object field on a light receiving surface of said first light receiving means;
second light receiving means for receiving a light beam and producing a second pair of output signals, the ratio of said second pair of output signals varying in conformity with the position of a light beam from a second area of the object field on the light receiving surface of said second light receiving means;
driving means for driving a photo-taking lens on the basis of one of the ratios of said first pair of output signals and said second pair of output signals; and
operating means adapted to operate on the basis of the sum of said first pair of output signals when said first light receiving means receives the light beam from said remote control apparatus, said operating means not operating on the basis of the sum of said second pair of output signals when said second light receiving means receives the light beam from said remote control apparatus.

10. A camera according to claim 9, wherein said operation means starts a photographing operation on the basis of the sum of said first pair of output signals and said second pair of output signals.

11. A camera according to claim 9, wherein said driving means drives the photo-taking lens on the basis of one of the ratio of said first pair of output signals and the ratio of said second pair of output signals.

12. A camera capable of operating by a light beam applied by a remote control apparatus, including:
light emitting means for emitting a light beam to a plurality of areas in a field to be photographed;
first light receiving means for receiving a light beam and producing a first pair of output signals, the ratio of said first pair of output signals varying in conformity with the position of a light beam from a first area of the object field on a light receiving surface of said first light receiving means;
second light receiving means for receiving a light beam and producing a second pair of output signals, the ratio of said second pair of output signals varying in conformity with the position of a light beam from a second area of the object field on a light receiving surface of said second light receiving means;
driving means for driving a photo-taking lens on the basis of one of the ratios of said first pair of output signals and said second pair of output signals; and
operating means adapted to operate when at least one of said first and second light receiving means receives the light beam from said remote control apparatus, said operating means operating on the basis of at least one of the sum of the first pair of output signals and the sum of the second pair of output signals.

13. A camera according to claim 12, wherein said operation means starts a photographing operation on the basis of the sum of the pair of output signals of at least one of said first and said second light receiving means.

14. A camera according to claim 13, wherein said driving means drives the photo-taking lens on one of the basis of the ratio of said first pair of output signals and the ratio of said second pair of output signals.

15. A camera capable of operating by a light beam applied by a remote control apparatus removably mounted on said camera, comprising:
light emitting means for emitting a light beam to a field to be photographed;
light receiving means for receiving a light beam and producing a pair of output signals, a ratio of said pair of output signals varying in conformity with the position of the light beam on the light receiving surface of said light receiving means;

driving means for driving a photo-taking lens on the basis of the ratio of said pair of output signals;

detecting means for detecting that said remote control apparatus is removed from said camera and outputting a detection signals; and operating means responsive to said detection signal for determining the sum of said pair of output signals and starting a photographing operation on the basis of the sum of said pair of output signals.

16. A camera capable of operating by a light beam applied by a remote control apparatus removably mounted on said camera, comprising:

light emitting means for emitting a light beam to a field to be photographed;

first light receiving means for receiving a light beam and producing a first pair of output signals, a ratio of said first pair of output signals varying in conformity with the position of the light beam on a light receiving surface of said light receiving means;

second light receiving means for receiving a light beam and producing a second pair of output signals, a ratio of said second pair of output signals varying in conformity with the position of the light beam on a light receiving surface of said light receiving means;

driving means for driving a photo-taking lens on the basis of one of the ratios of said first and said second pairs of output signals;

detecting means for detecting that said remote control apparatus is removed from said camera and outputting a detection signal; and operating means responsive to said detection signal for determining the sum of said first pair of output signals and starting a photographing operation on the basis of the sum of said first pair of output signals.

17. A camera according to claim 16, wherein said operating means does not determine the sum of said second pair of output signals.

18. A camera according to claim 16, wherein said operating means determines the sum of said second pair of output signals and starts the photographing operation on the basis of the sums of said first and said second pairs of output signals.

* * * * *